(12) United States Patent
Kurita et al.

(10) Patent No.: US 8,641,114 B2
(45) Date of Patent: Feb. 4, 2014

(54) ROBOT HAND

(75) Inventors: Yuichi Kurita, Nara (JP); Atsutoshi Ikeda, Nara (JP); Yasuhiro Ono, Nara (JP); Tsukasa Ogasawara, Nara (JP)

(73) Assignee: National University Corporation Nara Institute of Science and Technology, Nara (JP)

( * ) Notice: Subject to any disclaimer, the term of this patent is extended or adjusted under 35 U.S.C. 154(b) by 143 days.

(21) Appl. No.: 13/132,164

(22) PCT Filed: Dec. 3, 2009

(86) PCT No.: PCT/JP2009/070312
§ 371 (c)(1),
(2), (4) Date: Jun. 23, 2011

(87) PCT Pub. No.: WO2010/064684
PCT Pub. Date: Jun. 10, 2010

(65) Prior Publication Data
US 2011/0241368 A1    Oct. 6, 2011

(30) Foreign Application Priority Data
Dec. 3, 2008   (JP) .................................. 2008-308303

(51) Int. Cl.
*B25J 15/08*   (2006.01)
(52) U.S. Cl.
USPC ................ 294/106; 294/111; 901/28; 901/39
(58) Field of Classification Search
USPC ........ 294/106, 902, 111, 213; 901/32, 36, 39, 901/19, 25, 28, 29, 31; 623/24, 57, 64; 74/490.04, 490.05, 490.06; 414/5, 7
See application file for complete search history.

(56) References Cited

U.S. PATENT DOCUMENTS

| 4,921,293 | A | * | 5/1990 | Ruoff et al. | .................... 294/111 |
| 5,080,682 | A | * | 1/1992 | Schectman | ..................... 623/64 |
| 5,447,403 | A | * | 9/1995 | Engler, Jr. | .......................... 414/4 |
| 6,517,132 | B2 | * | 2/2003 | Matsuda et al. | .............. 294/106 |
| 7,222,904 | B2 | * | 5/2007 | Matsuda | ....................... 294/111 |
| 2001/0028174 | A1 | * | 10/2001 | Matsuda et al. | .............. 294/106 |
| 2011/0067520 | A1 | * | 3/2011 | Ihrke et al. | ................. 74/490.05 |
| 2011/0163561 | A1 | * | 7/2011 | Kim et al. | ...................... 294/111 |

OTHER PUBLICATIONS

"Written Opinion of the International Searching Authority" (English Translation), PCT/JP2009/070312, May 7, 2011.

* cited by examiner

*Primary Examiner* — Paul T Chin
(74) *Attorney, Agent, or Firm* — Ogilvie Law Firm

(57) ABSTRACT

A robot hand which can be formed in the shape of a human hand and improves maintenance performance, and generates fingertip force is provided. A robot hand (1) of the present invention is provided with a hand section (3) and an arm section (5). The hand section (3) corresponds to the portion of a human hand which is forward from the wrist thereof. The arm section (5) is provided with a drive device (d5) including a plurality of motors and generates driving torque for driving each movable section of the hand section (3). The hand section (3) and the arm section (5) are configured in such a manner that a group (g36) of wrist-mounted pulleys which are first driving torque transmitting members coaxially arranged and a group (r5) of arm pulleys which are second driving torque transmitting members coaxially arranged transmit driving torque generated by the drive device (d5) to each movable section of the hand section (3) via gears meshing with each other.

22 Claims, 17 Drawing Sheets

(1)

(2)

ROBOT HAND

FIELD OF THE INVENTION

The present invention relates to a robot hand, specifically, a robot hand that can be easily maintained and capable of obtaining fingertip force although the robot hand is small in size.

BACKGROUND OF THE INVENTION (1) An example of a conventional robot hand will be described. FIG. 15 shows a thumb of a robot hand having five fingers like a human hand. The robot hand has a thumb, an index finger, a middle finger, a ring finger, a little finger, and a palm. The thumb shown in FIG. 15 includes a first joint 107 that bends forward, a second joint 108 that turns inward and outward, a third joint 109 that bends forward, a fourth joint 110 that bends forward, a first motor 111, a second motor 112, a third motor 113, a fourth motor 114, a first motor encoder 115, a second motor encoder 116, a third motor encoder 117, a fourth motor encoder 118, an asymmetric differential speed reducer 119, a joint axis integral speed reducer 120, a worm reducer 121, and a 6-axis force/moment sensor 122.

Here, the rotation amounts of the motors 111 to 114 can be detected by the motor encoders 115 to 118 directly connected to the motor shafts. The axes of the joints 107, 109, and 110 are parallel to each other, and the joint axis of the joint 107 and the joint axis of the joint 108 cross each other at one point at right angles. The first motor 111 and the second motor 112 are overlapped and fixed to the palm.

The thumb shown in FIG. 15 moves as follows. By the fourth motor 114, the joint axis of the joint 110 axially rotated by 90 degrees with respect to the motor shaft can be driven via the worm reducer 121. By the third motor 113, the joint axis of the joint 109 rotated by 90 degrees with respect to the motor shaft can be driven via the joint axis integral speed reducer 129. The asymmetric differential speed reducer 119 is configured as a mechanism in which the shaft of a third bevel gear (not shown) is formed to be hollow and the shaft of a fourth bevel gear (not shown) is made to penetrate through the third bevel gear to allow the second joint 108 to rotate around its axis and the first joint 107 to rotate around its axis.

Here, when the first motor 111 and the second motor 112 rotate the same angle in directions opposite to each other, the finger rotates around the axis of the second joint 108 via the bevel gears inside the asymmetric differential speed reducer 119. When the first motor 111 is fixed and the second motor 112 is rotated, the finger rotates around the axis of the first joint 107. By adopting the asymmetric differential speed reducer 119, the rotation angle around the axis of the first joint 107 can be made larger, and the joint axis can be provided at a position close to the surface side of the palm, so that movement similar to the movement of a human hand is realized in external appearance (Patent Document 1).

(2) Another example of a conventional robot hand will be described with reference to FIG. 16. The robot hand shown in FIG. 16 drives and rotates a drive shaft 821 (not shown) by a motor 822 to swing a finger 814a with respect to a palm 812 (not shown) in an extended state (dotted line in the drawing) of the finger 814a where joint sections 816 to 818 straighten. When the drive shaft 821 is thus driven and rotated, the joint axis 820 accordingly swings around the intersection with the drive shaft 821, and as a result, the finger 814a swings with respect to the palm 812.

On the other hand, in order to bend the finger 814 from the extended state, a bevel gear 844 is driven and rotated by a motor 834. When the bevel gear 844 is thus driven, the rotational driving torque thereof is transmitted to the proximal section 816 via the bevel gear 828 and the bevel gear 824, and as a result, the proximal section 816 turns around the joint axis 820, and the finger 814a tilts toward the inner side of the hand. In this case, the bevel gear 844 is driven and rotated according to driving of a bevel gear 838 (not shown) to rotate a link 846 (bevel gear 826). Specifically, as described above, the proximal section 816 and the intermediate section 817 of the finger 814a are linked to each other by the link 848, so that when only the proximal section 816 is attempted to be turned around the joint axis 820, this turning is obstructed by the link 848. Therefore, in order to avoid this, a cam 846 is turned as shown by the arrow in the same drawing according to the turning amount (angle) of the proximal section 816. In detail, a pulley 838 (not shown) is driven and rotated by a motor 832. When the pulley 838 is thus driven, the rotational driving torque thereof is transmitted to the bevel gear 826 via a bevel gear 830 (not shown), and as a result, the link 846 integrally fitted to the bevel gear 826 is turned.

The above-described movement is when the finger 814a bends to the inner side of the hand with respect to the palm 812 while the finger 814a is in an extended state, and on the other hand, when the finger 814a bends from a middle point, the link 846 (bevel gear 826) is further rotated from the above-described position. When the cam 846 is thus rotated, the intermediate section 817 is drawn to the inner side of the hand via the link 848, and as a result, the intermediate section 817 turns around the joint axis 819a, and the intermediate section 817 bends to the inner side of the hand with respect to the proximal section 816. When the intermediate section 817 thus bends with respect to the proximal section 816, the distal section 818 is drawn via a link 850, and as a result, the distal section 818 turns around the joint axis 819b, and the distal section 818 bends to the inner side of the hand with respect to the intermediate section 817.

Here, a movement of bending the entire finger 814a around the joint axis 820 with respect to the palm 812 and a movement of bending the intermediate section 817 and the proximal section 816 around the joint axes 819a and 819b are described separately, however, by performing these movements concurrently, a movement of bending the finger 814a can be performed smoothly. By performing a movement inverse to the above-described movement, the finger 814a can be returned to an extended state (Patent Document 2).

[Patent document 1] Japanese Patent No. 3245095
[Patent document 2] Japanese Unexamined Patent Publication No. JP2005-66803

DISCLOSURE OF THE INVENTION

Problem to be Solved by the Invention

However, the above-described robot hand 100 needs to be improved in the following point.

That is, in the robot hand 100, on the thumb, the first motor 111, the second motor 112, the third motor 113, and the fourth motor 114 are disposed. These are also provided on other fingers. Therefore, the sizes of the motors 111 to 114 determine the size of the robot hand 100. Specifically, if downsizing of the robot hand 100 is given priority, the motors must be downsized, and as a result, fingertip force cannot be obtained.

Also, the above-described robot hand 810 needs to be improved in the following point. In the robot hand 810, the joint sections 816 to 818 are moved by the motors 822, 832, and 834. Therefore, in order to obtain fingertip force on the distal section 818, the motors need to be increased in size, and as a result, the robot hand 810 becomes larger in size.

Therefore, an object of the present invention is to provide a robot hand that can be formed in the shape of a human hand, easily maintained, and obtain fingertip force.

Means for Solving the Problem

Means of the present invention for solving the problems are shown below.

A robot hand according to the present invention includes a hand section having movable sections of finger joints and an arm section that generates driving torque for driving the movable sections, and 1) the hand section includes first pulleys that are disposed in the movable sections and turn in a movable direction, second pulleys disposed on the wrist side with respect to the movable sections, first driving torque transmitting members that transmit driving torque for rotating the second pulleys, linear members that are fixed to the first pulleys and fixed to the second pulleys to connect the first pulleys and the second pulleys, the first driving torque transmitting members are configured integrally with the second pulleys and have a rotational axis coaxial with the rotational axis of the second pulleys, and 2) the arm section includes second driving torque transmitting members that transmit driving torque to the first driving torque transmitting members and drive units that generate driving torque, and moves the movable sections.

With this configuration, the hand section and the arm section can be individually unitized and separable from each other. Driving torque for moving finger joints is output from the drive units in the arm section, and based on the driving torque, the second driving torque transmitting members can be driven. Here, the second driving torque transmitting members are, for example, a plurality of independent pairs of a gear and a pulley, and the drive units are, for example, motors.

Driving torque generated by the drive units is transmitted to the first driving torque transmitting members of the hand section via the second driving torque transmitting members. The first driving torque transmitting members are a plurality of independent pairs of gears, etc. The first driving torque transmitting members are configured integrally with the pulleys (second pulleys), and accordingly, the second pulleys corresponding to a plurality of finger joints joined to the first driving torque transmitting members are driven. From the second pulleys, driving torque is transmitted to the first pulleys joined via linear members such as wires, and as a result, a certain one or a plurality of finger joints are driven.

Specifically, in order to bring the robot hand closer to the shape of a human hand, in the arm section, the drive units and the second driving torque transmitting members are disposed, and in the hand section, the first driving torque transmitting members (integrated with the second pulleys) and the first pulleys that become finger joints are disposed. Transmission of driving torque is enabled by the second driving torque transmitting members and the first driving torque transmitting members, and accordingly, by driving the first driving torque transmitting members by driving the second driving torque transmitting members in the arm section, the second pulleys can be operated, and eventually, the first pulleys can be operated. Specifically, by controlling the operations of the second driving torque transmitting members in the arm section, the operations of the first pulleys of the finger joints can be controlled.

By providing the first driving torque transmitting members and the second driving torque transmitting members, the hand section and the arm section can be completely and easily separated from each other, and this improves maintenance performance in repair and inspection, etc.

By providing the first driving torque transmitting members on an axis parallel to the wrist joint coaxially, when the hand section is moved, it becomes possible to easily perform compensation for operation of other pulleys as described below. That is, although all pulleys rotate according to movement of the hand section, these pulleys are coaxial, so that it becomes easy to calculate correction values or correction coefficients of joint angles with respect to joint angle instruction values of finger joints to be sent to the drive units.

Accordingly, when a finger joint or a hand section is moved, it becomes possible to easily perform compensation for movements of other finger joints.

A robot hand according to the present invention includes a hand section having movable sections of finger joints and an arm section that generates driving torque for driving the movable sections, and 1) the hand section includes first pulleys that are disposed in the movable sections and turn in a movable direction, second pulleys disposed on the wrist side with respect to the movable sections, first driving torque transmitting members that transmit driving torque for rotating the second pulleys, linear members that are fixed to the first pulleys and fixed to the second pulleys to connect the first pulleys and the second pulleys, the first driving torque transmitting members are configured integrally with the second pulleys and have a rotational axis coaxial with the rotational axis of the second pulleys, 2) the arm section includes second driving torque transmitting members that transmit driving torque to the first driving torque transmitting members, drive units that generate driving torque, and a control unit that controls the drive units, and 3) the control unit calculates rotation angle correction values of the first pulleys, stores information of correction values of joint angle instruction values of finger joints to be sent to the drive units, and performs joint angle control for the second driving torque transmitting members to perform compensation for operation of interference of the second pulleys caused by rotation of the first driving torque transmitting members, and moves the movable sections.

With this configuration, the hand section and the arm section are unitized individually, signals for moving finger joints are output from the control unit in the arm section, and based on the signals, the second driving torque transmitting members are driven. The second driving torque transmitting members transmit driving torque to the first driving torque transmitting members of the hand section, and furthermore, pulleys for a plurality of joints joined to the first driving torque transmitting members are driven. As a result, a certain finger joint or a plurality of finger joints are driven.

Here, in the control unit, the joint angle instruction values of finger joints to be sent to the drive units change according to movement, so that correction values or correction coefficients of the joint angles with respect to the instruction values are stored and used for control.

As described below, by installing the first driving torque transmitting members on an axis parallel to the wrist joint coaxially, when the hand section is moved, it becomes possible to easily perform compensation for operations of other pulleys. That is, although all pulleys rotate according to movement of the hand section, these pulleys are coaxial, so that it is easy to calculate correction values or correction coefficients of joint angles with respect to the joint angle instruction values of finger joints to be sent to the drive units.

Accordingly, when the finger joints or the hand section is moved, it becomes possible to easily perform compensation for movements of other finger joints.

Here, the movable section in the robot hand according to the present invention is preferably the movable section of any of the first proximal phalange section, the second proximal phalange section, and the intermediate phalange section of finger joints.

In the control unit, in response to signals corresponding to, for example, programmed independent movements and dependent movements of the fingers, driving torque is transmitted from the second driving torque transmitting members to the first driving torque transmitting members to enable rotation of the wrist, and driving torque is transmitted to a first proximal phalange pulley, a second proximal phalange pulley, and an intermediate phalange pulley corresponding to the finger joints of the first proximal phalange section, the second proximal phalange section, and the intermediate phalange section, and accordingly, the finger joints are driven.

Corresponding to the plurality of movable sections in the robot hand according to the present invention, it is preferable that a plurality of first pulleys, a plurality of second pulleys connected to the first pulleys via linear members, and a plurality of first driving torque transmitting members that are integrated with and rotate coaxially with the second pulleys, are provided coaxially.

With this configuration, when the hand section is moved around an axis on which the second pulleys are disposed, the second pulleys can be operated in the same manner, so that compensation for operations of the first pulleys can be easily performed.

The movable sections of the hand section in the robot hand according to the present invention are at least 15 movable sections of the first proximal phalange sections, the second proximal phalange sections, and the intermediate phalange sections of the first to fifth fingers, and at least 15 first driving torque transmitting members corresponding to the movable sections are preferably provided coaxially.

With this configuration, at least 15 movable sections corresponding to the first proximal phalange sections, the second proximal phalange sections, and the intermediate phalange sections of the first to fifth fingers can be moved.

The first driving torque transmitting members in the robot hand according to the present invention are preferably installed on an axis parallel to the wrist joint coaxially.

With this configuration, movement of the wrist joint can be the movement of rotating around the rotational axis of the first driving torque transmitting members.

By installing the first driving torque transmitting members on an axis parallel to the wrist joint coaxially, when the hand section is moved, compensation for other pulleys can be easily performed. That is, all pulleys rotate according to the movement of the hand section, and these pulleys are coaxial, so that it becomes easy to calculate correction values or correction coefficients of joint angles with respect to joint angle instruction values of finger joints to be sent to the drive units.

The hand section and the arm section in the robot hand according to the present invention are preferably joined to and separated from each other via the first driving torque transmitting members and the second driving torque transmitting members.

By making the hand section and the arm section separable from each other, it becomes possible to perform maintenance such as part replacement and movement inspection of these sections separately.

The second driving torque transmitting members in the robot hand according to the present invention preferably correspond to the first driving torque transmitting members on a one-to-one basis.

With this configuration, it is necessary to have as many second driving torque transmitting members as movable sections, so that the number of actuators increases, however, the movable sections can be controlled independently, so that movements of the finger joints can be made closer to movements of human finger joints.

The second driving torque transmitting members in the robot hand according to the present invention preferably correspond to a plurality of the first driving torque transmitting members on an N-to-one basis (N is not less than 2).

By making the second driving transmitting member correspond to a plurality of the first driving torque transmitting members, it becomes possible to control the plurality of fingers by a smaller number of actuators than the number of finger joints to be driven. Accordingly, the function can be changed according to use without changing the hand section.

This is useful when it is desired to simplify control or when complex movements are not necessary.

It is preferable that the second driving torque transmitting member in the robot hand according to the present invention collectively moves a plurality of first driving torque transmitting members corresponding to the movable sections of the third finger to the fifth finger.

By making the second driving torque transmitting member correspond to a plurality of first driving torque transmitting members for the movable sections of the third finger to the fifth finger, it becomes possible to control the movable sections of the third finger to the fifth finger by one actuator, so that the number of actuators can be significantly reduced.

This is useful when it is desired to simplify control or when complex movements are not necessary.

It is preferable that the second pulleys for movable sections associated with each other are disposed adjacent to each other in the robot hand according to the present invention.

Accordingly, the second pulleys for movable sections associated with each other can be operated by one driving torque generation unit, so that the number of actuators can be reduced.

Preferably, the movable sections of the hand section in the robot hand according to the present invention are at least 15 movable sections corresponding to the joints of the first proximal phalange sections, the second proximal phalange sections, and the intermediate phalange sections of the first to fifth fingers, and a movable section of the wrist joint, and at least 15 first driving torque transmitting members corresponding to at least the 15 movable sections and a wrist driving torque transmitting member corresponding to the movable section of the wrist joint are provided coaxially, respectively.

With this configuration, at least 15 movable sections corresponding to the joints of the first proximal phalange section, the second proximal phalange section, and the intermediate phalange section of the first to fifth fingers, and a movable section of the wrist joint can be moved.

Preferably, the hand section in the robot hand according to the present invention includes a rotating member that is disposed in an adjacent movable section that is adjacent to a certain movable section and rotates in the movable direction of the adjacent movable section, and a link member that links a first pulley corresponding to the movable section and the rotating member corresponding to the adjacent movable section.

Accordingly, by operating one first pulley, the adjacent movable section can also be moved. Therefore, the number of actuators for moving the movable sections of the hand section can be reduced.

Effects of the Invention

The present invention has an effect of realizing a robot hand which can be formed in the shape of a human hand, easily maintained due to its hand section and arm section separable from each other, and obtain fingertip force. When a finger joint or the hand section is moved, compensation for movements of other finger joints can be easily performed.

BRIEF DESCRIPTION OF THE DRAWINGS

FIG. 5 is a view showing a configuration of a first proximal phalange section pulley p321a.

FIG. 8 is a view of a configuration of a wrist-mounted pulley g321a.

FIG. 10-1 is a view showing an example of a configuration of second driving torque transmitting members.

FIG. 10-2 is a view showing another example of a configuration of second driving torque transmitting members.

BEST MODE FOR CARRYING OUT THE INVENTION

Hereinafter, embodiments of the present invention will be described in detail with reference to the drawings.

Example 1

I. Configuration of Robot Hand 1
1. Entire Configuration

Figure 1:
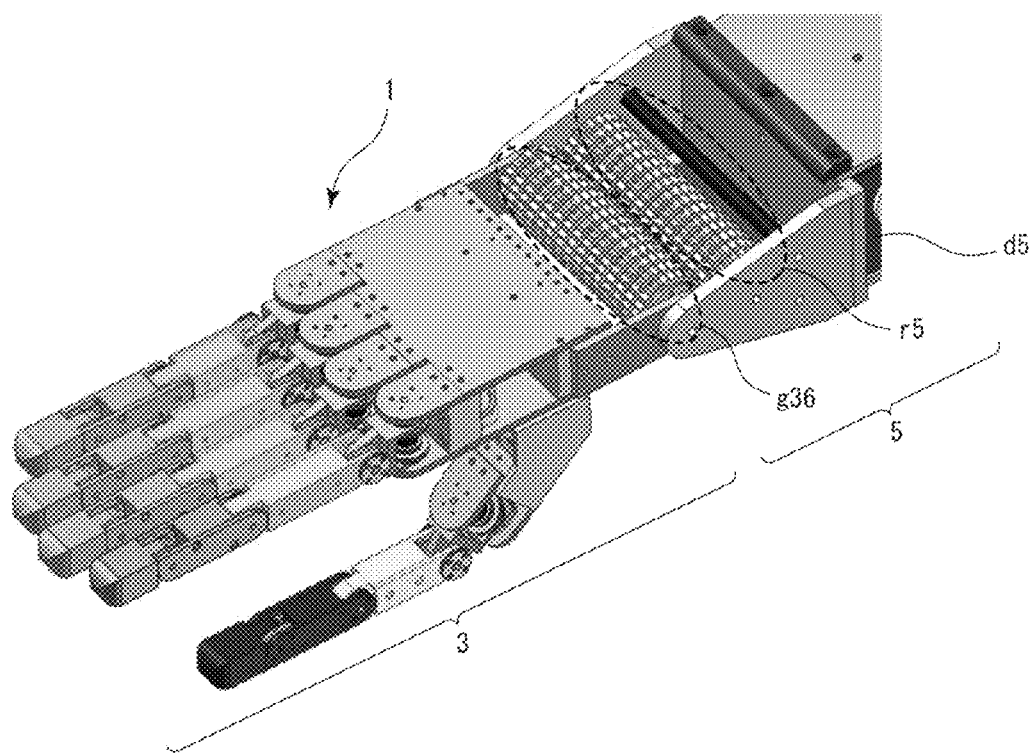
FIG. 1 is a view showing a robot hand 1 according to the present invention.

An entire configuration of a robot hand 1 according to the present example will be described with reference to FIG. 1. The robot hand 1 includes a hand section 3 and an arm section 5. The hand section 3 corresponds to a portion forward from the wrist of a human. The arm section 5 includes a drive device d5, and generates driving torque for driving movable sections of the hand section 3. The hand section 3 and the arm section 5 transmit driving torque generated by the drive device d5 to the hand section 3 by meshing between a wrist-mounted pulley group g36 and an arm section pulley group r5.

2. Structure of Human Hand

Before describing the configuration of the hand section 3, the structure of a human hand will be described with reference to FIG. 2. A human hand has a first finger (thumb) h1, a second finger (index finger) h2, a third finger (middle finger) h3, a fourth finger (ring finger) h4, a fifth finger (little finger) h5, and a palm h6. The second finger h2 consists of three phalanges of a proximal phalange b21, an intermediate phalange b22, and a distal phalange b23. The metacarpophalangeal joint j21 is formed between the metacarpal b62 corresponding to the second finger of the palm h6 and the proximal phalange b21 of the second finger h2, the proximal interphalangeal joint j22 is formed between the proximal phalange b21 and the intermediate phalange b22 of the second finger h2, and the distal interphalangeal joint j23 is formed between the intermediate phalange b22 and the distal phalange b23 of the second finger h2. The third finger h3, the fourth finger h4, and the fifth finger h5 are formed in the same manner as described above.

The first finger h1 consists of two phalanges b11 and b12 unlike the second finger h2 to the fifth finger h5. The metacarpophalangeal joint j11 is formed between the metacarpal b61 corresponding to the first finger of the palm h6 and the phalange b11 of the first finger h1, and the phalangeal joint j12 is formed between the phalange b11 and the phalange b12 of the first finger h1.

3. Configuration of Hand Section 3

Figure 3:
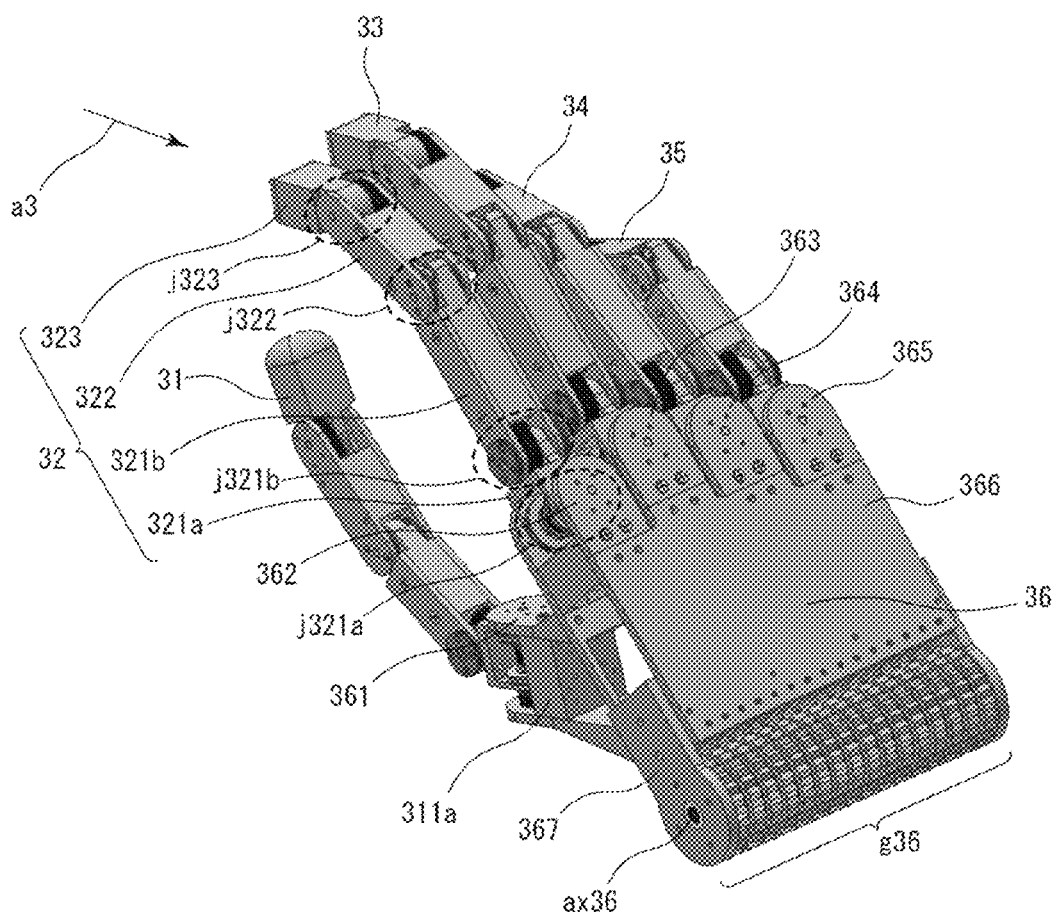
FIG. 3 is a view showing a configuration of a hand section 3.

A configuration of the hand section 3 will be described with reference to FIG. 3. The hand section 3 includes a first finger section 31, a second finger section 32, a third finger section 33, a fourth finger section 34, a fifth finger section 35, and a palm section 36 corresponding to the first finger (thumb), the second finger (index finger), the third finger (middle finger), the fourth finger (ring finger), the fifth finger (little finger), and the palm of a human.

The second finger section 32 includes a first proximal phalange section 321a, a second proximal phalange section 321b, an intermediate phalange section 322, and a distal phalange section 323. The first proximal phalange section 321a and the second proximal phalange section 321b correspond to the phalange b21 of the second finger of a human, the intermediate phalange section 322 corresponds to the intermediate phalange b22 of the second finger of a human, and the distal phalange section 323 corresponds to the distal phalange b23 of the second finger of a human.

A first metacarpophalangeal joint j321a is formed at the connecting portion between the palm section 36 and the first proximal phalange section 321a of the second finger section 32, a second metacarpophalangeal joint j321b is formed at the connecting portion between the first proximal phalange section 321a and the second proximal phalange section 321b, a proximal interphalangeal joint j322 is formed at the connecting portion between the proximal phalange section 321 and the intermediate phalange section 322, and a distal interphalangeal joint j323 is formed at the connecting portion between the intermediate phalange section 322 and the distal phalange section 323. The first metacarpophalangeal joint j321a and the second metacarpophalangeal joint j321b correspond to the metacarpophalangeal joint j21, and the proximal interphalangeal joint j322 corresponds to the proximal interphalangeal joint j22, and the distal interphalangeal joint j323 corresponds to the distal interphalangeal joint j23.

The third finger section 33, the fourth finger section 34, and the fifth finger section 35 are configured in the same manner as described above.

4. Configurations of Finger Sections

(1) Configuration of Second Finger Section 32

Figure 4:
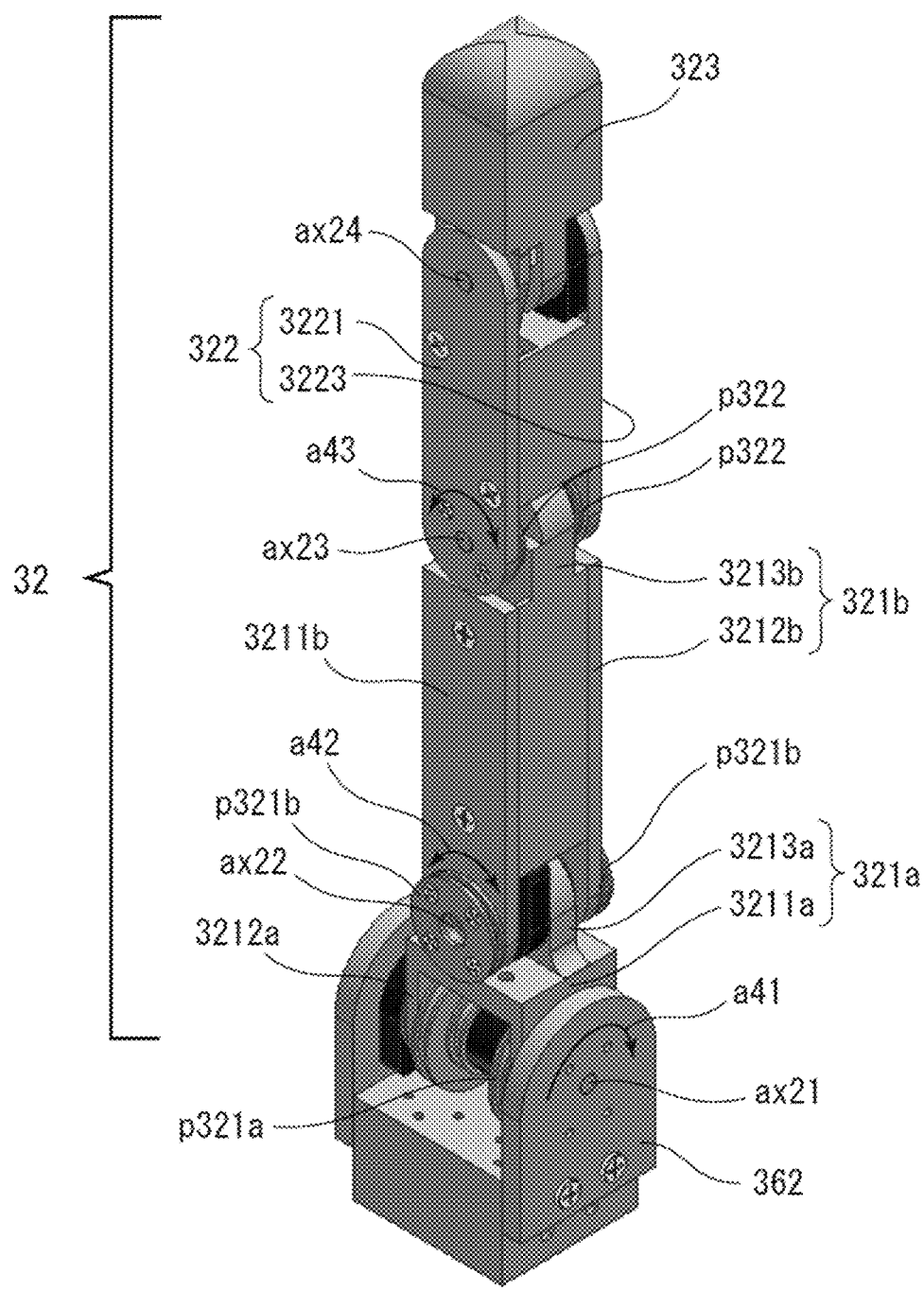
FIG. 4 is a view showing a configuration of a second finger section 32.

Next, a configuration of the second finger section 32 in FIG. 3 will be described with reference to FIG. 4. FIG. 4 shows the second finger section 32 viewed in the arrow a3 direction in FIG. 3.

First Proximal Phalange Section 321a

The first proximal phalange section 321a has an overturned U-shape. The first proximal phalange section 321a has an upper surface 3211a, a lower surface 3212a, and a protruding section 3213a. The upper surface 3211a and the lower surface 3212a have a hole through which an axis ax21 penetrates. The first proximal phalange section 321a is connected to a second finger section fixing member 362 of the palm section 36 via the axis ax21. The first proximal phalange section 321a rotates in the arrow a41 direction with respect to the axis ax21. The protruding section 3213a has a hole (not shown) through which an axis ax22 penetrates.

The first proximal phalange section pulley p321a is fixed to the upper surface 3211a and the lower surface 3212a. Therefore, the first proximal phalange section pulley p321a moves integrally with the first proximal phalange section 321a. The first proximal phalange section pulley p321a rotates in the arrow a41 direction that is the movement direction of the first proximal phalange section 321a via the axis ax21.

Figure 5:
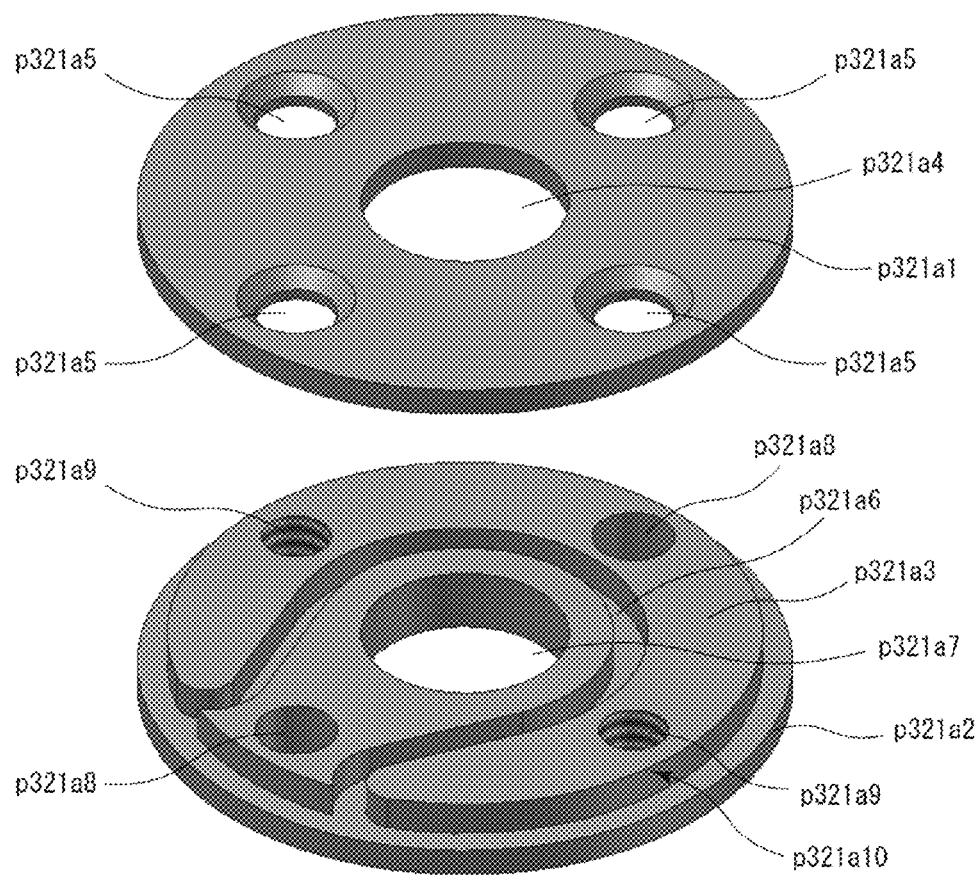

Here, a configuration of the first proximal phalange section pulley 321a will be described with reference to FIG. 5. The first proximal phalange section pulley p321a has a lid section p321a1, a bottom section p321a2, and an intermediate section p321a3. The lid section p321a1 has a disk shape. The lid section p321a1 has a hole p321a4 and four holes p321a5. The axis ax21 penetrates through the hole p321a4. Screws (not shown) for fixing the lid section p321a1 to the intermediate section p321a3 and the bottom section p321a2 penetrate through the holes p321a5. The bottom section p321a2 is formed in the same manner as described above.

The intermediate section p321a3 has a cylindrical shape with a diameter smaller than the diameter of the lid section p321a1 and the bottom section p321a2. Therefore, by integrating the lid section p321a1, the bottom section p321a2, and the intermediate section p321a3, a groove p321a10 in which a wire is located can be formed on the intermediate section p321a3. The intermediate section p321a3 has a hole p321a7, two threaded holes p321a9, and two non-threaded holes p321a8. The axis ax21 penetrates through the hole p321a7. Screws (not shown) for fixing the lid section p321a1 to the intermediate section p321a3 and the bottom section p321a2 penetrate through the holes p321a8. On the holes p321a9, a thread groove that threadably engages with the screw for fixing the lid section p321a1 to the intermediate section p321a3 and the bottom section p321a2 is formed.

The intermediate section p321a3 has a wire locating hole p321a6 formed to surround the periphery of the hole p321a7 inside. Therefore, by locating a wire so as to pass through the groove p321a10 and the wire locating hole p321a6, the first proximal phalange section pulley p321a can be operated integrally with an operation of the wire.

The first metacarpophalangeal joint j321a is formed by the first proximal phalange section pulley p321a, the axis ax21, the upper surface 3211a and the lower surface 3212a of the first proximal phalange section 321a.

Second Proximal Phalange Section 321b

As shown in FIG. 4, the second proximal phalange section 321b has a quadrangular prism shape. The second proximal phalange section 321b has a first side section 3211b, a second side section 3212b, and a protruding section 3213b. The first side section 3211b and the second side section 3212b have a hole (not shown) through which the axis ax22 penetrates at the end portion on the first proximal phalange section 321a side. The second phalange section 321b is connected to the first proximal phalange section 321b via the axis ax22. The second proximal phalange section 321b rotates in the arrow a42 direction with respect to the axis ax22. The protruding section 3213b has a hole (not shown) through which the axis ax23 penetrates. The first side section 3211b and the second side section 3212b are removably configured.

The second proximal phalange section pulley p321b is fixed to the first side section 3211b and the second side section 3212b. Therefore, the second phalange section pulley p321b operates integrally with the second proximal phalange section 321b. The second proximal phalange section pulley p321b rotates in the arrow a42 direction that is the movement direction of the second proximal phalange section 321b via the axis ax22. A configuration of the second proximal phalange section pulley p321b is the same as that of the first proximal phalange section pulley p321a.

The second metacarpophalangeal joint j321b is formed by the second proximal phalange section pulley p321b, the axis ax22, and the protruding section 3213a of the first proximal phalange section 321a.

Intermediate Phalange Section 322

As shown in FIG. 4, the intermediate phalange section 322 has a quadrangular prism shape. The intermediate phalange section 322 has a first side section 3221, a second side section 3222, and an intermediate section 3223. The first side section 3221 and the second side section 3222 have a hole through which the axis ax23 penetrates at the end portion on the second proximal phalange section 321b side. The first side section 3221 and the second side section 3222 are removably configured from the intermediate section 3223. The intermediate phalange section 322 is connected to the second proximal phalange section 321b via an axis ax23. The intermediate phalange section 322 rotates in the arrow a43 direction with respect to the axis ax23.

The intermediate phalange section pulley p322 is fixed to the protruding section 3213b sides of the second proximal phalange section 321b of the first side section 3221 and the second side section 3222. Therefore, the intermediate phalange section pulley p322 operates integrally with the intermediate phalange section 322. The intermediate phalange section pulley p322 rotates in the arrow a43 direction that is the movement direction of the intermediate phalange section 322 via the axis ax23. The configuration of the intermediate phalange section pulley p322 is the same as that of the first proximal phalange section pulley p321a.

The proximal interphalangeal joint j322 is formed by the intermediate phalange section pulley p322, the axis ax23, a cam C323 (described below), a link bar L32 (described below), and the protruding section 3213b of the second proximal phalange section 321b.

Figure 6:
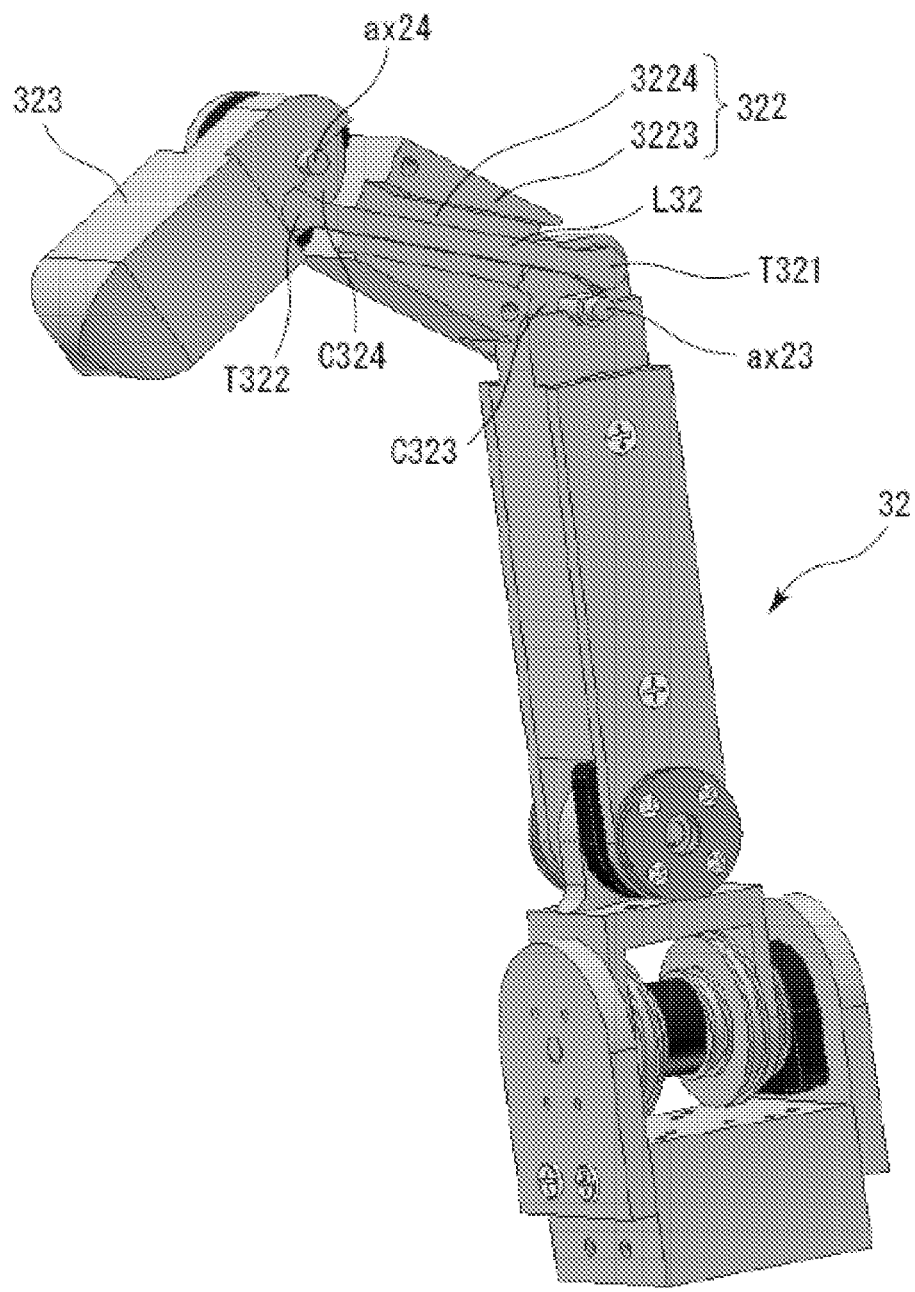
FIG. 6 is a partially developed view of the second finger section 32.

A state where the first side section 3221 and the intermediate phalange section pulley p322 are removed from the intermediate section 3223 is shown in FIG. 6. FIG. 6 shows a state where the second finger section 32 in FIG. 4 is bent at the proximal interphalangeal joint j322 and the distal interphalangeal joint j323.

The intermediate section 3223 has a link locating groove 3224. In the link locating groove 3224, the link bar L32 is located. One end T321 on the second proximal phalange section 321b side of the link bar L32 is connected to the cam C323 disposed coaxially with the axis ax23. One end T322 on the distal phalange section 323 side of the link bar L32 is connected to the cam C324 disposed coaxially with the axis ax24. Thus, the link bar L32 is disposed to connect the cam C323 and the cam C324. Therefore, the distal phalange section 323 can be bent in conjunction with bending of the intermediate phalange section 322. The distal interphalangeal joint j323 is formed by the axis ax24, the cam C324, and the link bar L32.

(2) Configuration of First Finger Section and Third Finger Section to Fifth Finger Section The first finger section 31 and the third finger section 33 to the fifth finger section 35 have the same configuration as that of the second finger section 32.

5. Configuration of Palm Section 36

A configuration of the palm section 36 will be described with reference to FIG. 3. The palm section 36 includes a first finger section fixing member 361, a second finger section fixing member 362, a third finger section fixing member 363, a fourth finger section fixing member 364, a fifth finger section fixing member 365, a main body section 366, connecting sections 367, and a wrist-mounted pulley group g36.

The first finger section fixing member 361 fixes the first finger section 31 to the main body section 366 via the first proximal phalange section 311a of the first finger section 31. The second finger section fixing member 362 to the fifth finger section fixing member 365 are configured in the same manner as described above.

The main body section 366 includes the first finger section fixing members 361 to 365 on the respective finger section sides, and the connecting sections 367 on the wrist side. The connecting sections 367 are fixed to left and right side surfaces of the main body section 366.

The connecting sections 367 have a pulley fixing axis ax36 disposed across the main body section 366. On the pulley fixing axis ax36, the wrist-mounted pulley group g36 consisting of wrist-mounted pulleys to be connected to the pulleys disposed on the first finger section 31 to the fifth finger section 35 via wires is disposed.

Figure 7:
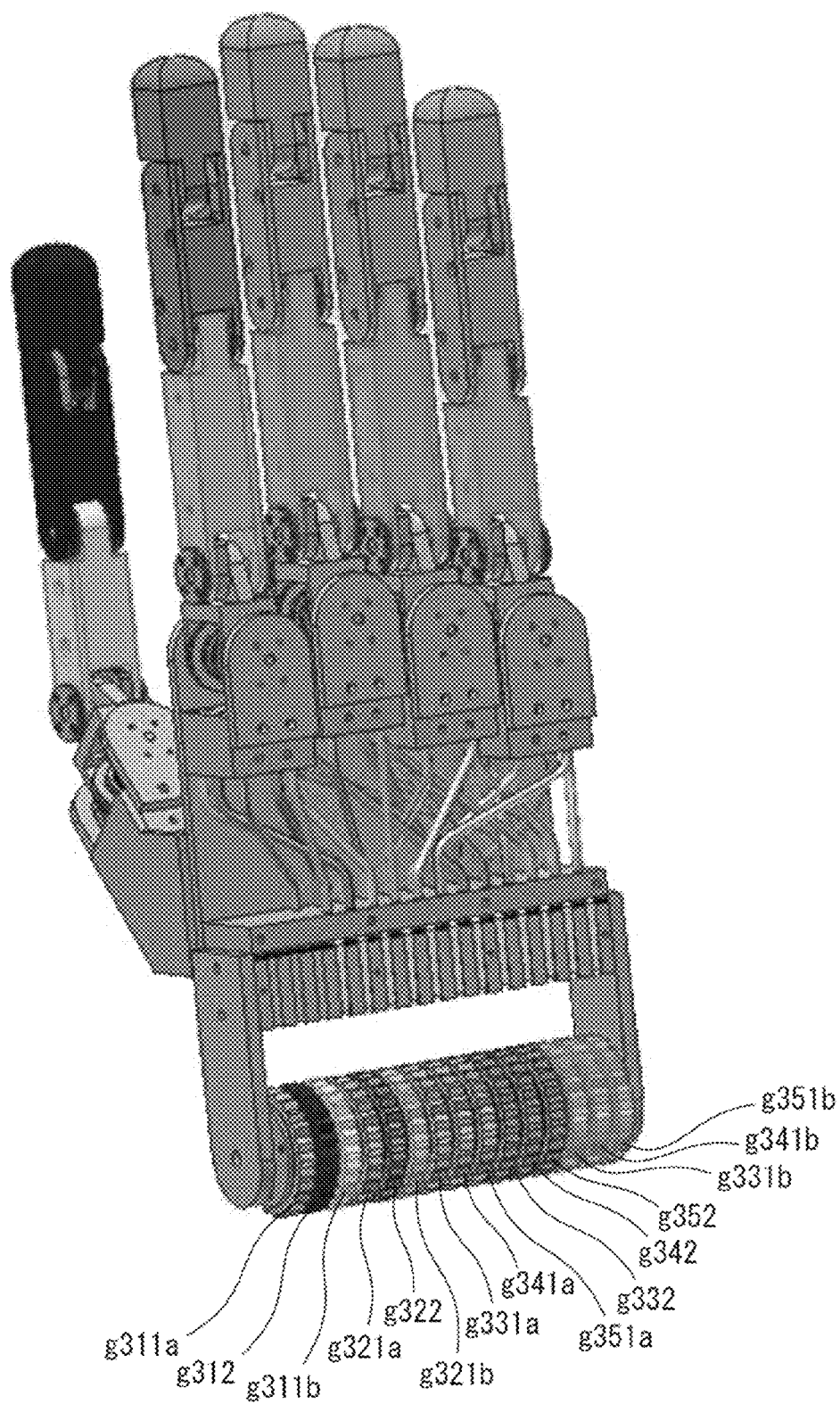
FIG. 7 is a partially developed view of a palm section 36.

Here, the wrist-mounted pulley group g36 will be described with reference to FIG. 7. FIG. 7 shows a state where the upper surface section of the main body section 366 of the palm section 36 is removed. In the wrist-mounted pulley group g36, as viewed from the first finger section 31, the wrist-mounted pulley g311a, the wrist-mounted pulley g312, the wrist-mounted pulley g311b, the wrist-mounted pulley g321a, the wrist-mounted pulley g322, the wrist-mounted pulley g321b, the wrist-mounted pulley g331a, the wrist-mounted pulley g341a, the wrist-mounted pulley g351a, the wrist-mounted pulley g332, the wrist-mounted pulley g342, the wrist-mounted pulley g352, the wrist-mounted pulley g331b, the wrist-mounted pulley g341b, and the wrist-mounted pulley g351b are disposed in order. Here, the wrist-mounted pulley g311a, the wrist-mounted pulley g312, and the wrist-mounted pulley g311b are a pulley to be connected to the first proximal phalange section pulley p311a of the first finger section 31, a pulley to be connected to the second proximal phalange section 311b, and a pulley to be connected to the intermediate phalange section pulley p312, respectively. Other wrist-mounted pulleys are also configured in the same manner as described above.

Thus, by moving the finger sections by using the pulleys disposed in the first finger section 31 to the fifth finger section 35 and the wrist-mounted pulleys g311a to g352 connected via wires, the hand section 3 and the arm section 5 can be separated from each other. By disposing the wrist-mounted pulley group g36 on a pulley fixing axis ax36, even when the hand section 3 is bent around the pulley fixing axis ax36 with respect to the arm section 5, compensation for movements of the finger sections based on the bending can be easily performed.

The wrist-mounted pulleys g331b, g341b, and g351b are disposed adjacent to each other. Thus, by disposing the wrist-mounted pulleys g331b, g341b, and g351b adjacent to each other which move the second proximal phalange sections 331b, 341b, and 351b of the finger sections, the wrist-mounted pulleys g331b, g341b, and g351b can be operated by one drive device d5 (described below). Therefore, the number of drive devices d5 for moving the finger sections can be reduced. The wrist-mounted pulleys g332, g342, and g352 and the wrist-mounted pulleys g331a, g341a, and g351a are configured in the same manner as described above.

Figure 8:
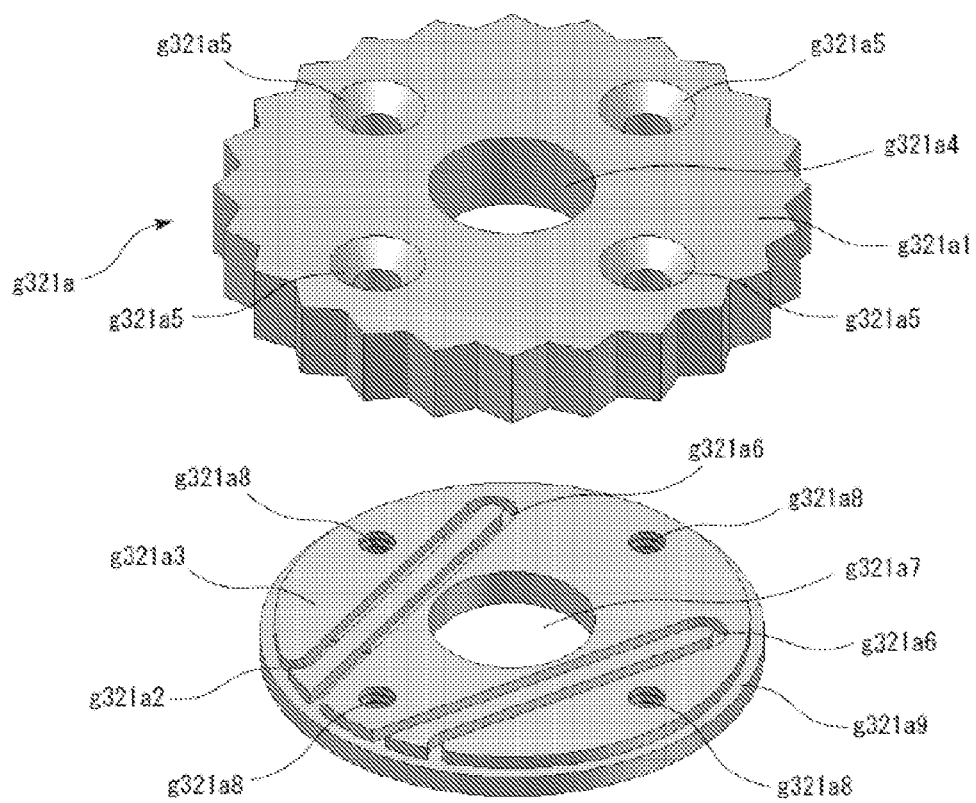

Here, a configuration of the wrist-mounted pulley g321a will be described with reference to FIG. 8. The wrist-mounted pulley g321a includes a gear section g321a1, a bottom section g321a2, and an intermediate section g321a3. The gear section g321a1 has a disk shape, and on its side surface, gear teeth are formed. The gear section g321a1 has a hole g321a4 disposed at the center and four holes g321a5 disposed around the hole g321a4. The pulley fixing axis ax36 penetrates through the hole g321a4. Screws (not shown) for fixing the gear section g321a1 to the intermediate section g321a3 and the bottom section g321a2 penetrate through the holes g321a5.

The bottom section g321a2 has a disk shape. The bottom section g321a2 has a hole disposed at the center and four holes disposed around the central hole. The pulley fixing axis ax36 penetrates through the hole disposed at the center. The screws (not shown) for fixing the gear section g321a1 to the intermediate section g321a3 and the bottom section g321a2 penetrate through the holes disposed around the central hole.

The intermediate section g321a3 has a cylindrical shape with a diameter smaller than the diameter of the gear section g321a1 and the bottom section g321a2. Therefore, by integrating the gear section g321a1, the bottom section g321a2, and the intermediate section g321a3, a groove g321a9 in which a wire is located can be formed on the outer peripheral surface of the intermediate section g321a3. The intermediate section g321a3 has a hole g321a7 disposed at the center and four holes g321a8 disposed around the hole g321a7. The pulley fixing axis ax36 penetrates through the hole g321a7. The screws (not shown) for fixing the gear section g321a1 to the intermediate section g321a3 and the bottom section g321a2 penetrate through the holes g321a8. The intermediate section g321a3 has wire locating grooves g321a6 formed inside. Therefore, by locating a wire to pass through the groove g321a9 and the wire locating grooves g321a6, the wrist-mounted pulley g312a can be operated integrally with the operation of the wire. On the holes g321a8, a thread groove to threadably engage with the screw for fixing the gear section g321a1 to the intermediate section g321a3 and the bottom section g321a2 is formed. Other wrist-mounted pulleys are configured in the same manner as described above.

Thus, by thinning the pulleys and gears and configuring these integrally, the wrist-mounted pulleys g311a to g352 can be disposed in a row on the pulley fixing axis ax36. Accordingly, the hand section 3 and the arm section 5 can be separated from each other.

6. Configuration of Arm Section 5

Figure 9:
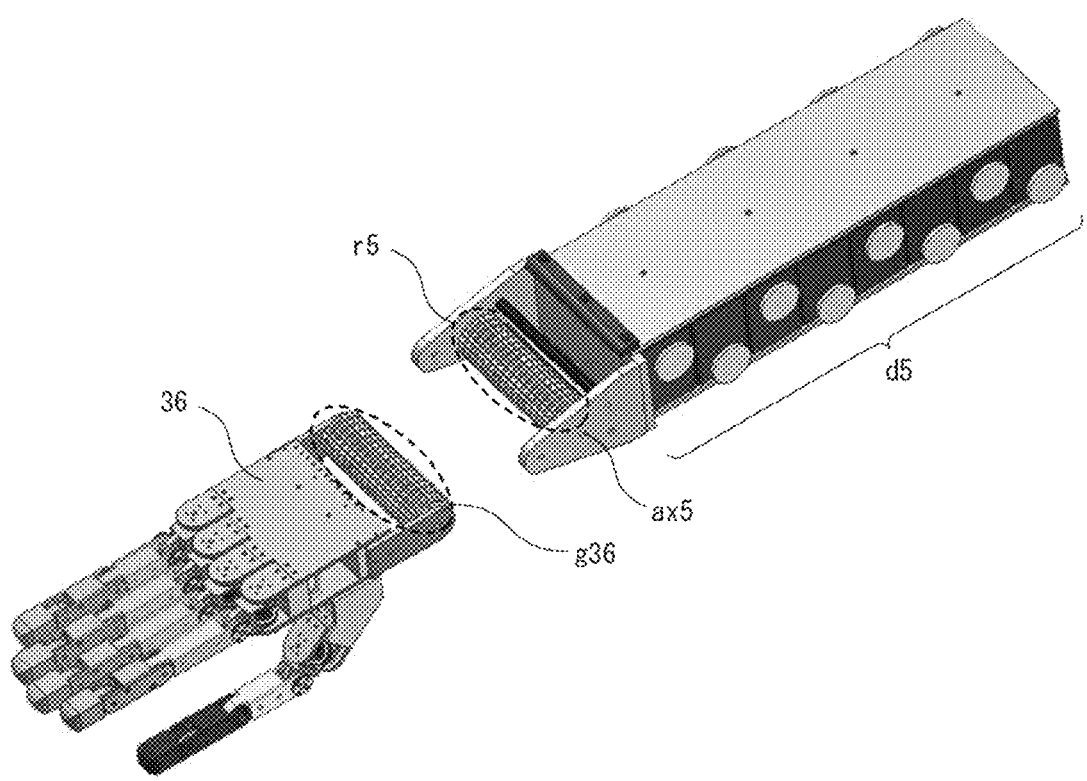
FIG. 9 is a view showing a state where the robot hand 1 is separated into the hand section 3 and the arm section 5.

A configuration of the arm section 5 will be described with reference to FIG. 9. FIG. 9 shows a state where the hand section 3 and the arm section 5 of the robot hand 1 are separated from each other. The arm section 5 includes an arm section pulley group r5 formed by arm section pulleys that mesh with the wrist-mounted pulleys belonging to the wrist-mounted pulley group g36 of the palm section 36. The arm section pulley group r5 includes arm section pulleys r311a, 311b, 312, . . . (not shown). The arm section pulley r311a meshes with the wrist-mounted pulley g311a, the arm section pulley r311b meshes with the wrist-mounted pulley g311b, and the arm section pulley r312 meshes with the wrist-mounted pulley g312. Other arm section pulleys mesh with the wrist-mounted pulleys in the same manner as described above. The arm section pulleys belonging to the arm section pulley group r5 are fixed in a row to an arm section pulley fixing axis ax5.

Accordingly, the arm section 5 includes, in addition to the arm section pulley group r5, a control circuit for operating the arm section pulley group r5 and a drive device d5 consisting of actuators. The arm section pulleys belonging to the arm section pulley group r5 are operated by the drive device d5.

Thus, operation control by actuators via the control circuit is possible, so that operation control of the finger sections can be easily performed. Furthermore, the hand section 3 and the arm section 5 can be separated from each other, so that maintenance performance for each of these can be improved. Furthermore, the drive device d5 is disposed in the arm section 5, so that the drive device d5 can be freely selected according to use of the robot hand 1.

Next, an example of a configuration of the second driving torque transmitting member will be described with reference to FIG. 10-1 and FIG. 10-2.

As described above, by installing the driving torque transmitting members of the first driving torque transmitting members and the second driving torque transmitting members coaxially on axes parallel to the wrist joint, when moving the hand section, it becomes possible to easily perform compensation for operations of other pulleys. The driving torque transmitting members are formed by gears, and the gears are disposed coaxially. The correspondence between the gears of the first driving torque transmitting members and the second driving torque transmitting members can be freely changed. For example, the view of FIG. 10-1 shows an example in which the gears of the second driving torque transmitting members and the gears of the first driving torque transmitting members correspond to each other on a one-to-one basis. This example is characterized in that the joints can be driven individually.

Figure 2:
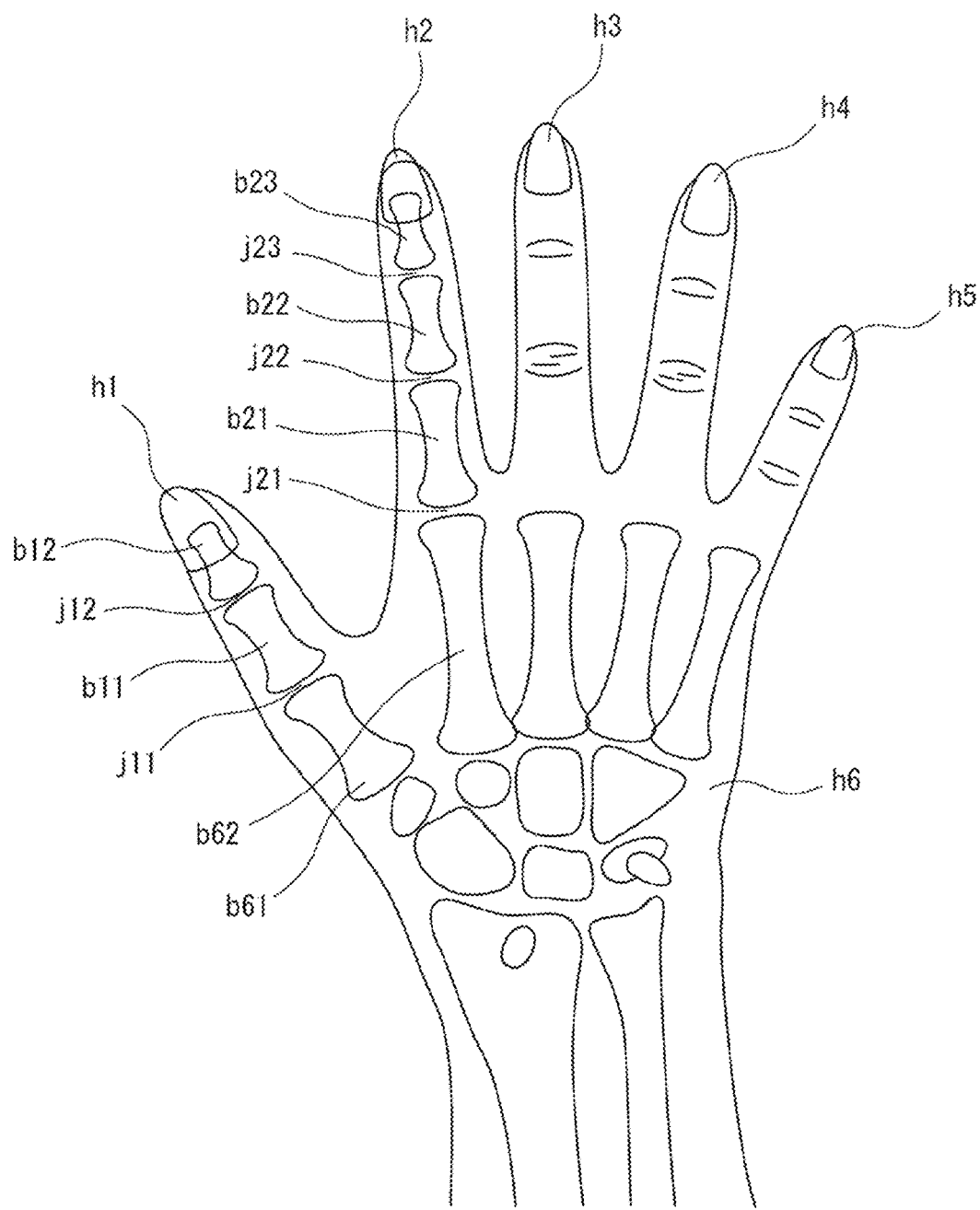
FIG. 2 is a view showing a structure of a human hand.
Figures 1, 10:
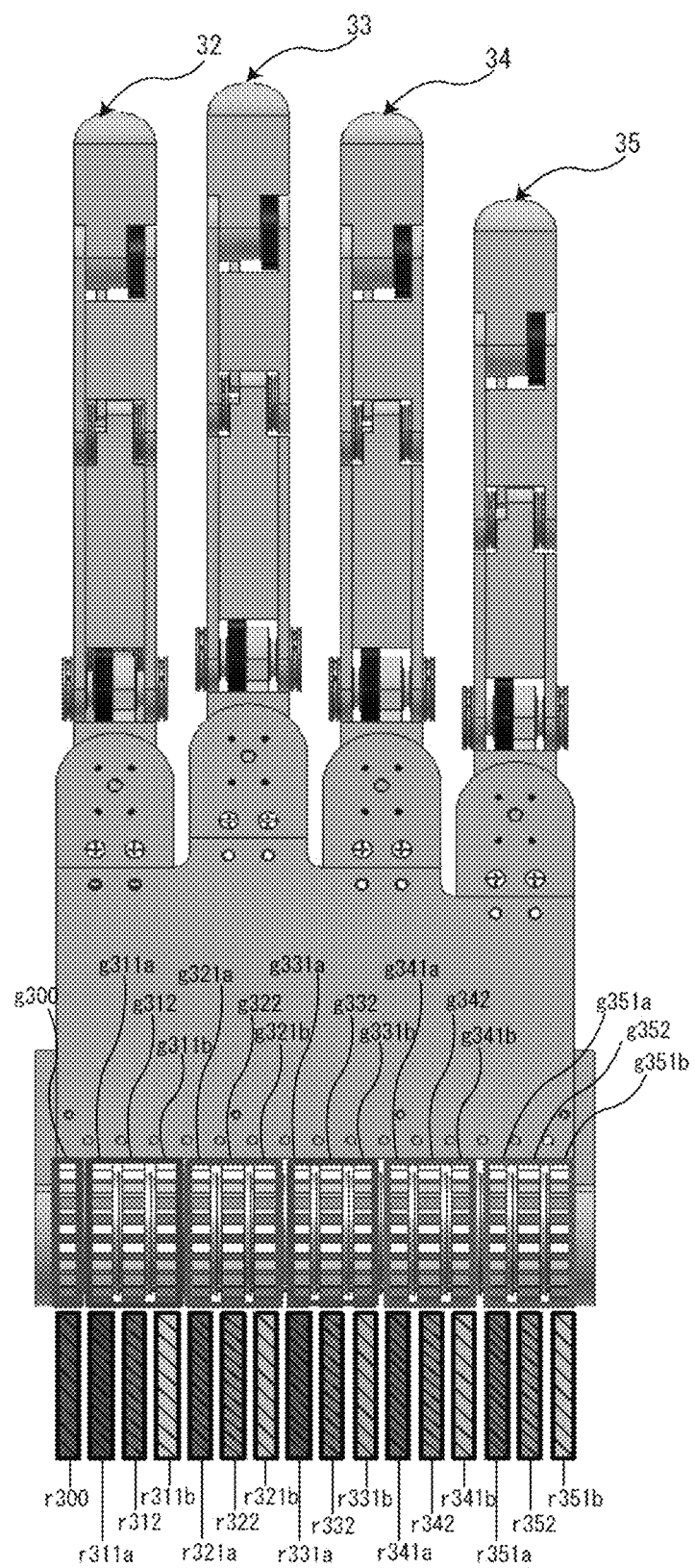
Figures 2, 10:
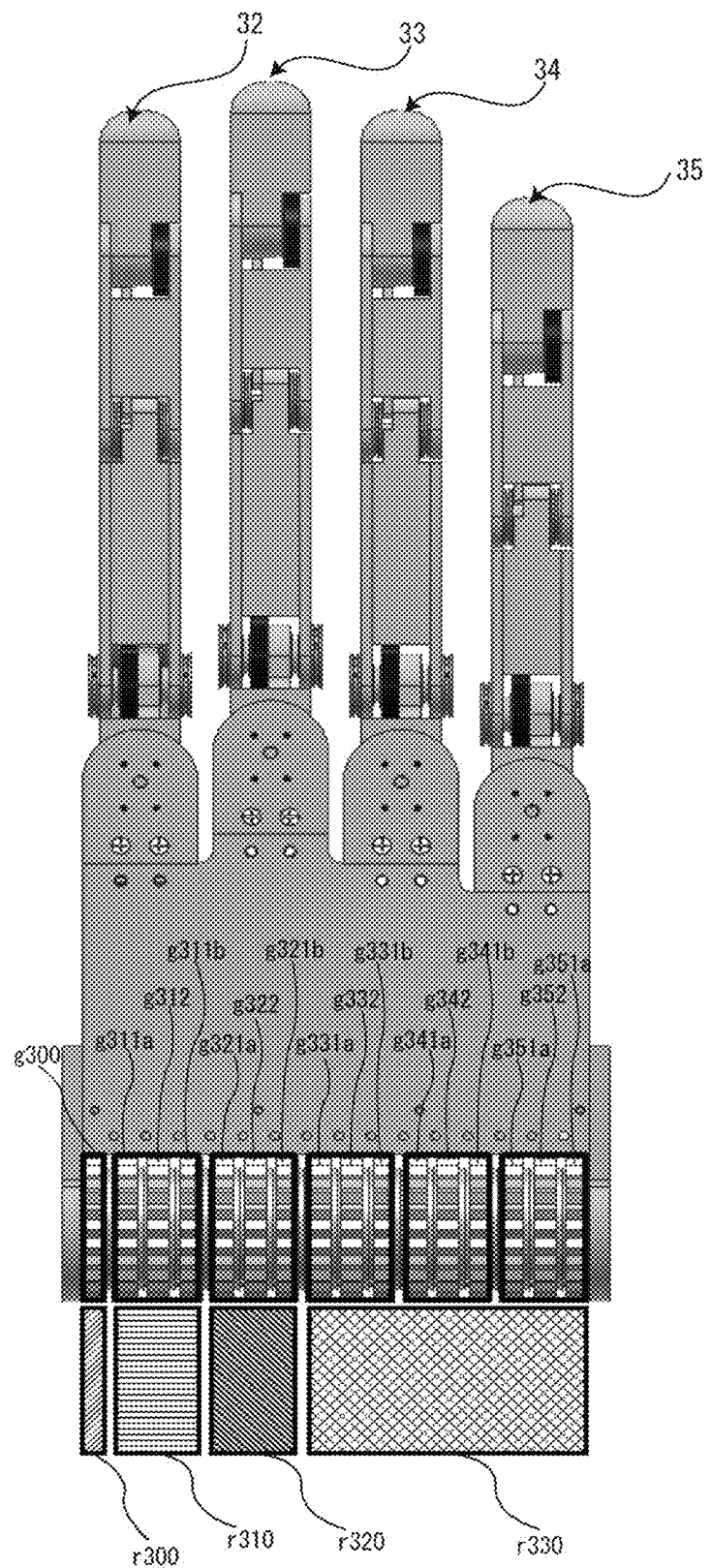

On the other hand, the view of FIG. 10-2 shows an example in which the gears of the second driving torque transmitting members and the gears of the first driving torque transmitting members correspond to each other on a one-to-plural basis. This example is characterized in that a plurality of joints can be moved by a smaller number of actuators. This is effective when it is desired to simplify control or complex movements are not necessary.

Without limiting to the above-described examples, the disposition of the first driving torque transmitting members can be freely determined, and the correspondence between the gears of the second driving torque transmitting members and the gears of the first driving torque transmitting members can be freely determined.

Figure 11:
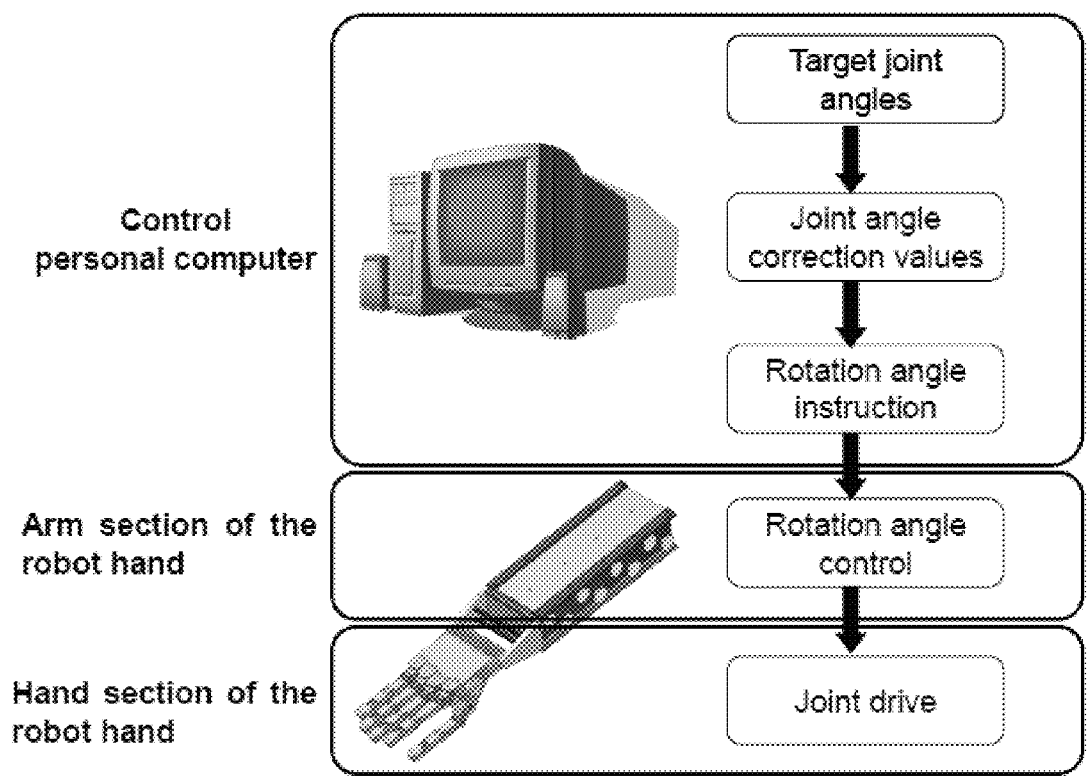
FIG. 11 is an explanatory view showing steps of controlling joint angles of the joints of the hand section.

Next, steps of controlling joint angles of the joints of the hand section will be described with reference to FIG. 11. FIG. 11 shows an example for controlling joint angles of the joints (including the wrist joint) of the hand section. Target joint angles are input into a control personal computer (PC), and correction values for compensating for movement interference occurring between the driving torque transmitting members and the first proximal phalange sections, etc., are calculated based on the design specifications of the mechanical dimensions of the robot hand, and accordingly, joint angle instruction values to be sent to the motors are determined in advance.

In the arm section 5 in the robot hand 1, according to the given joint angle instruction values, torque control is performed by PID control, etc. A motor torque generated in the arm section is transmitted to each joint via the wires and gears.

Figure 12:
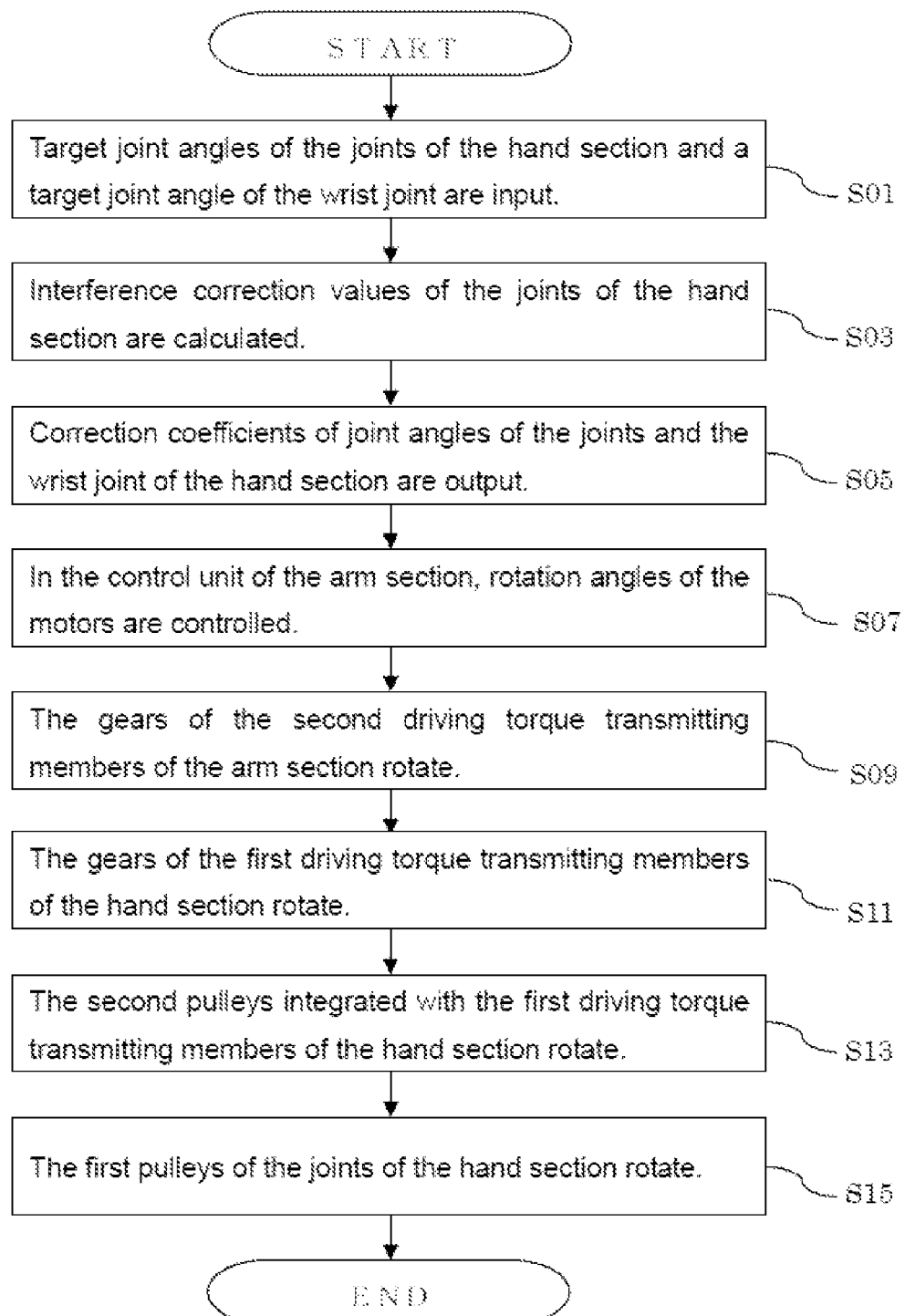
FIG. 12 is a control flowchart of joint angles of the joints of the hand section.

FIG. 12 shows a control flowchart for controlling joint angles of the joints of the hand section. First, target joint angles of the joints of the hand section and a target joint angle of the wrist joint are input (Step S01), and based on the design specifications of the mechanical dimensions of the robot hand, interference correction values of the joints of the hand section are calculated (Step S03).

The design specifications of the mechanical dimensions of the robot hand are determined from the diameters of pulleys that guide routes of wires joining the first pulleys and the second pulleys. Then, correction coefficients of joint angles of the joints and the wrist joint of the hand section are output to the control unit of the arm section of the robot hand (Step S05).

In the control unit of the arm section, rotation angles of the motors are controlled according to the correction coefficients set in advance for the joint angles (Step S07). The gears of the second driving torque transmitting members of the arm section rotate (Step S09), and accordingly, the gears of the first driving torque transmitting members of the hand section rotate (Step S11). According to rotation of the gears of the first driving torque transmitting members, the second pulleys integrated with the first driving torque transmitting members of the hand section rotate (Step S13), the first pulleys of the joints of the hand section rotate (Step S15), and movable sections such as the finger joints move.

Figure 13:
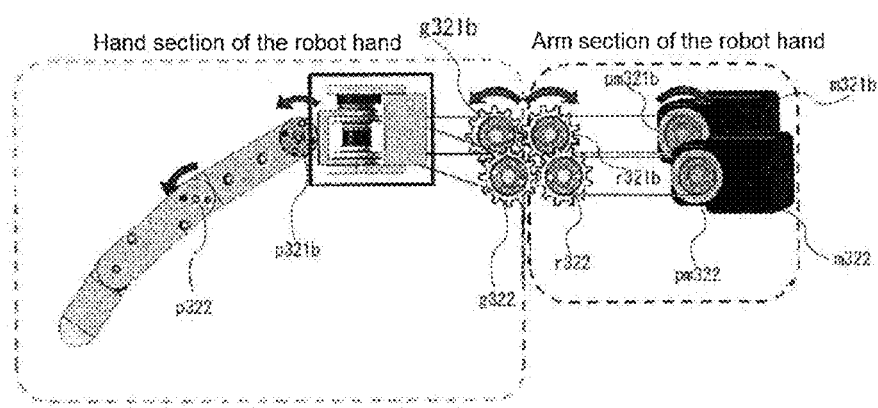
FIG. 13 are views schematically showing transmission of driving torque from motors of the arm section of the robot hand 1 to two pulleys of finger joints of the hand section.
Figure 13:
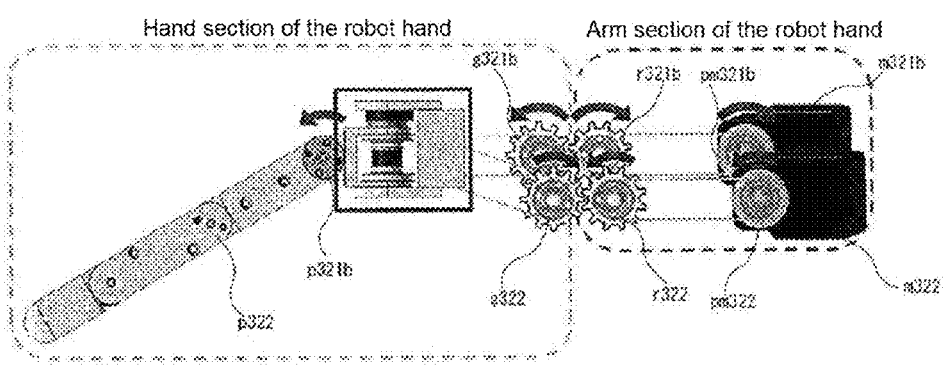

Next, FIG. 13 schematically shows transmission of driving torque to two pulleys (the second proximal phalange section pulley p321b and the intermediate phalange section pulley p322 in FIG. 4) of the finger joints of the hand section from the motors of the arm section of the robot hand 1. In FIG. 13, a difference between the case where interference correction is not applied to the intermediate phalange section pulley p322 (FIG. 13(1)) and the case where the interference correction is applied thereto (FIG. 13(2)) is shown.

When the second proximal phalange section pulley p321b of the joint of the second proximal phalange 321b is driven without performing interference correction, in the intermediate phalange section 322, the intermediate phalange section pulley p322 connected to the second proximal phalange section pulley p321b is rotated according to rotation of the second proximal phalange 321b (refer to FIG. 13(1)). By performing angle correction based on a design value calculated in advance for this interference, as shown in FIG. 13(2), by giving driving torque to the gears of the second driving torque transmitting members so as to rotate the gears of the first driving torque transmitting members so that the intermediate phalange section pulley p322 is rotated reversely, the rotation of the intermediate phalange section pulley p322 generated in the intermediate phalange section 322 can be canceled.

Figure 14:
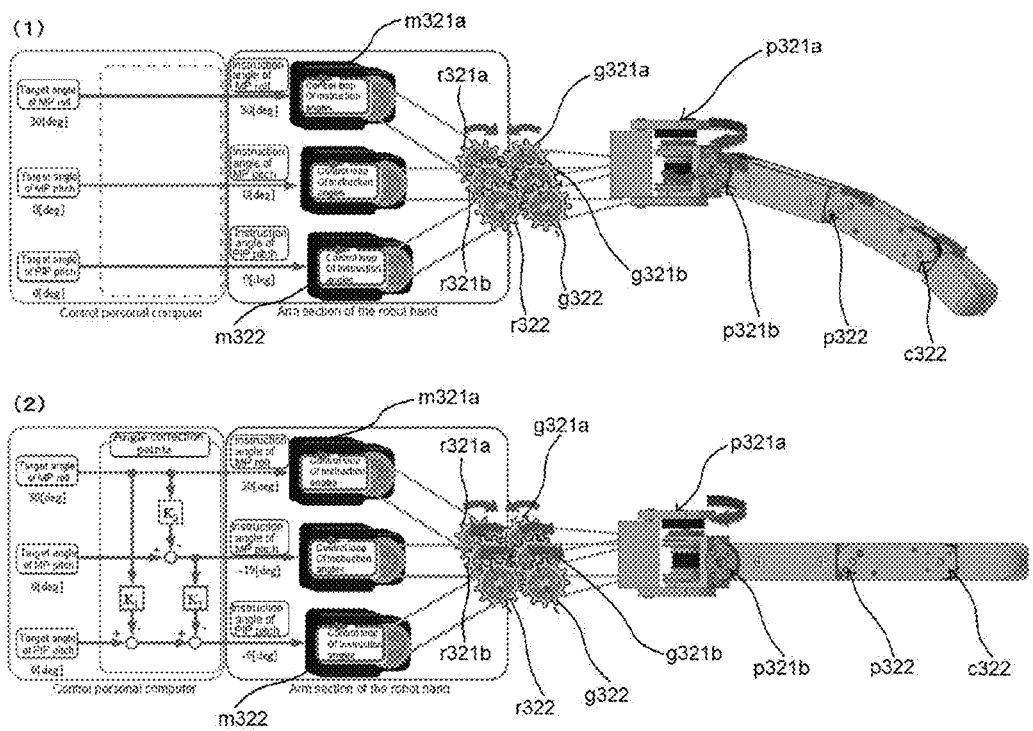
FIG. 14 are views schematically showing transmission of driving torque from motors of the arm section of the robot hand 1 to three pulleys of finger joints of the hand section.
Figure 15:
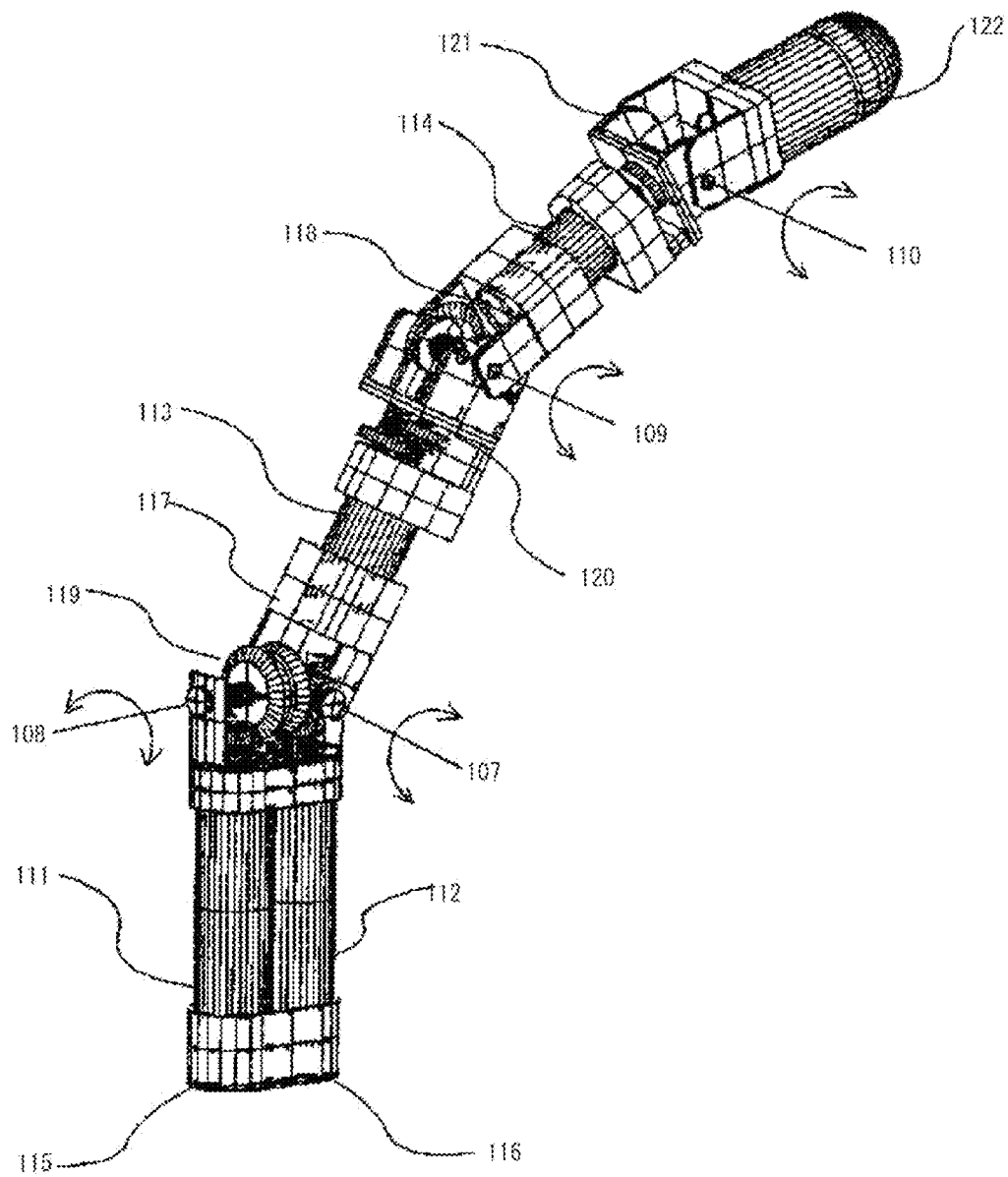
FIG. 15 is a view for describing a conventional robot hand 100.
Figure 16:
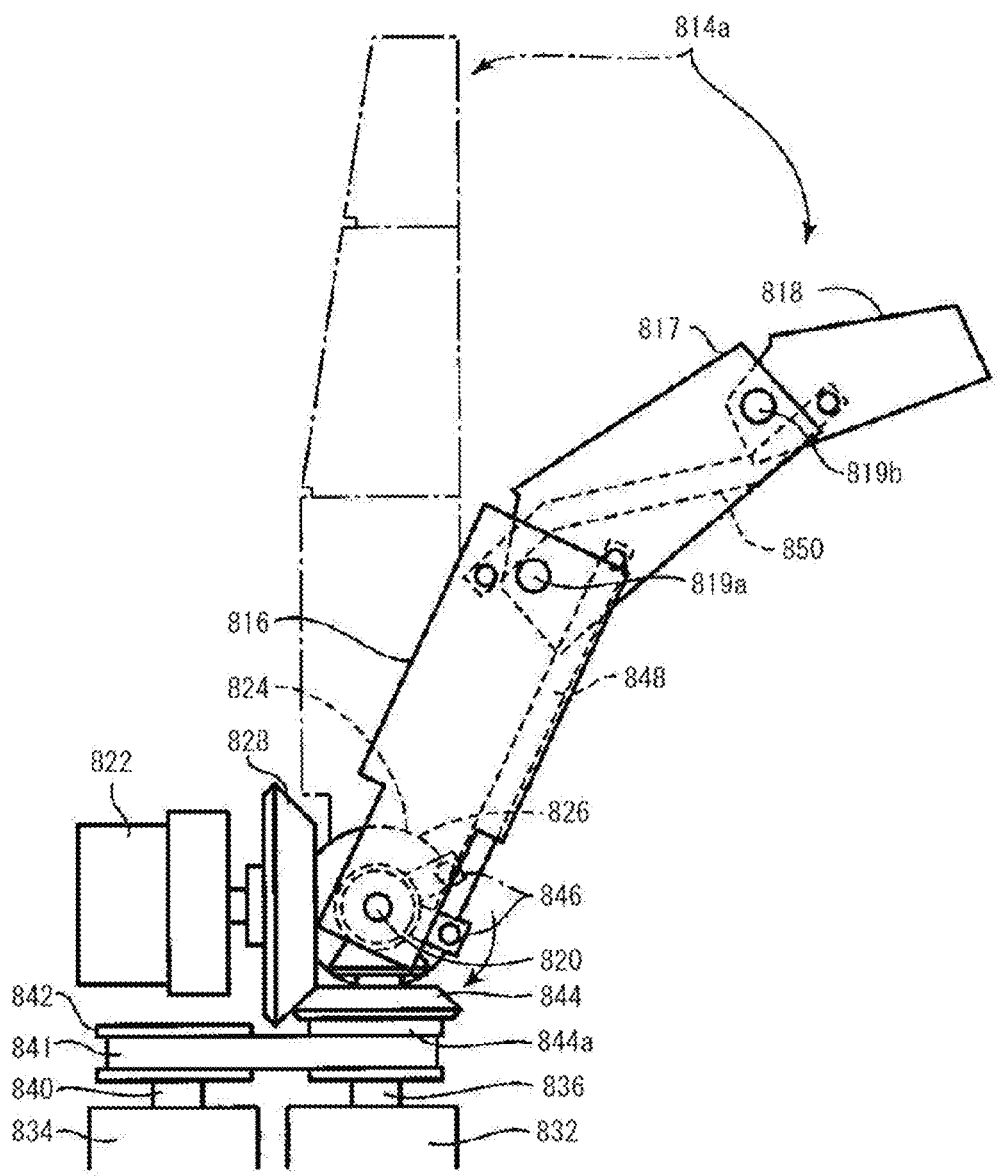
FIG. 16 is a view for describing a conventional robot hand 810.

FIG. 14 schematically shows transmission of driving torque from the motors of the arm section of the robot hand 1 to three pulleys (the first proximal phalange section pulley p321a, the second proximal phalange section pulley p321b, and the intermediate phalange section pulley p322) of the finger joints of the hand section in FIG. 4). In FIG. 14, a difference between the case where interference correction is not performed for the second proximal phalange section pulley p321b and the intermediate phalange section pulley p322 (FIG. 14(2)) and the case where the interference correction is performed (FIG. 14(2)).

Here, in FIG. 14 and the following description, the joint of the first proximal phalange section is referred to as an MP roll, the joint of the second proximal phalange section is referred to an MP pitch, and the joint of the intermediate phalange section is referred to as a PIP pitch.

When the joint (MP roll) of the first proximal phalange section 321a is driven without performing interference correction, according to rotation of the first proximal phalange section 321a (MP roll), the second proximal phalange section pulley p321b and the intermediate phalange section pulley p322 rotate. With respect to this interference, by performing joint angle correction based on the design values calculated in advance, the rotation of the second proximal phalange section pulley p321b and the intermediate phalange section pulley p322 in the first proximal phalange section 321a (MP roll) can be canceled.

An example of a calculating formula for performing joint angle correction based on the design values is shown in the following formula. Calculation of instruction values of the MP pitch and the PIP pitch is performed by performing correction based on correction coefficients determined according to the diameters of guide pulleys disposed between the first pulleys and the second pulleys with respect to target values of the MP pitch and the PIP pitch.

$$MP \text{ roll instruction value} = MP \text{ roll target value}$$

$$MP \text{ pitch instruction value} = MP \text{ pitch target value} - 0.64 \times MP \text{ roll instruction value}$$

$$PIP \text{ pitch instruction value} = PIP \text{ pitch target value} - 0.29 \times MP \text{ pitch instruction value} - 0.38 \times MP \text{ roll instruction value} \quad \text{(Numerical expression 1)}$$

In the robot hand according to the present invention, gears of the first driving torque transmitting members are disposed coaxially, so that it is possible to easily calculate an angle correction value for correcting interference caused by movement of the wrist from design dimensions.

Other Examples (1) Link Bar L32, Cam C324

In the above-described example 1, by operating the intermediate phalange section pulley p322 by using the cam C324 as a rotating member and the link bar L32 as a link member, the distal interphalangeal joint j322 as an adjacent movable section is also moved, however, the configuration is not limited to the illustrated one as long as the distal interphalangeal joint j322 can be moved by operating the intermediate phalange section pulley p322. For example, a mechanism using a wire and a pulley can also be used. The same applies to other distal interphalangeal joints.

(2) Wrist-Mounted Pulleys g311a to g352

In the above-described example 1, the gears of the wrist-mounted pulleys g311a to g352 as the first driving torque transmitting members have a rotational axis coaxial with the pulley fixing axis ax36 that is a rotational axis of the pulleys of the wrist-mounted pulleys g311a to g352 as the second pulleys, however, the gears are not limited to those illustrated as long as their rotational axis is coaxial with the pulley fixing axis ax36. For example, members that can be disposed coaxially and can transmit driving torque by using a belt, a chain, a magnet, and a cam, etc., may also be used.

(3) Control Method for Interference Correction of Joints of Hand Section

Other than the method in which interference correction values of the joints of the hand section are calculated based on the design specifications of mechanical dimensions of the robot hand, a method in which angle sensors are attached to the joints of the robot hand and signals from the sensors are fed-back to perform control or a method in which force control is performed by attaching force sensors may also be used.

INDUSTRIAL APPLICABILITY

The present invention is applicable to a robot hand, for example, a robot manipulator, an artificial arm, etc.

DESCRIPTION OF SYMBOLS

1: Robot hand
3: Hand section
5: Arm section
31: First finger section
32: Second finger section
33: Third finger section
34: Fourth finger section
35: Fifth finger section
36: Palm section
p311a, p321a, p331a, p341a, p351a:First proximal phalange section pulley
p311b, p321b, p331b, p341b, p351b: Second proximal phalange section pulley
m321a, m321b, m322: Motor
p312, p322, p332, p342, p352: Intermediate phalange section pulley
g311a, g312, g311b, g321a, g322, g321b, g331a, g331a, g331a, g332, g342, g352, g331b, g341b, g351b, g300: Wrist-mounted pulley (first driving torque transmitting member of hand section)
r311a, r312, r311b, r321a, r322, r321b, r331a, r331a, r331a, r332, r342, r352, r331b, r341b, r351b, r300: Second driving torque transmitting member of arm section

The invention claimed is:

1. A robot hand comprising a hand section having a movable section of a finger joint and an arm section that generates driving torque for driving the movable section, wherein
the hand section includes a first pulley that is disposed in the movable section and turns in a movable direction, a second pulley disposed on the wrist side with respect to the movable section, a first driving torque transmitting member that transmits driving torque for rotating the second pulley, a linear member that is fixed to the first pulley and fixed to the second pulley to connect the first pulley and the second pulley,
the first driving torque transmitting member is configured integrally with the second pulley and has a rotational axis coaxial with the rotational axis of the second pulley,
the arm section includes a second driving torque transmitting member that transmits the driving torque to the first driving torque transmitting member and a drive unit that generates the driving torque, and moves the movable section, and
wherein the hand section and the arm section are separably joined to each other by the first driving torque transmitting member and the second driving torque transmitting member.

2. The robot hand according to claim 1, wherein the movable section is a movable section of any of a first proximal phalange section, a second proximal phalange section, and an intermediate phalange section of finger joints.

3. The robot hand according to claim 1, wherein corresponding to a plurality of movable sections, a plurality of the first pulleys, a plurality of the second pulleys to be connected to the first pulleys via the linear members, and a plurality of the first driving torque transmitting members that are integrated with the second pulleys and rotate coaxially, are provided coaxially, respectively.

4. The robot hand according to claim 1, wherein the movable section of the hand section is at least 15 movable sections of first proximal phalange sections, second proximal phalange sections, and intermediate phalange sections of first to fifth fingers, and at least 15 of the first driving torque transmitting members corresponding to the movable sections are provided coaxially.

5. The robot hand according to claim 4, wherein the second driving torque transmitting member collectively moves a plurality of the first driving torque transmitting members corresponding to the movable sections of the third finger to the fifth finger.

6. The robot hand according to claim 4, wherein the second pulleys for the movable sections associated with each other are disposed adjacent to each other.

7. The robot hand according to claim 1, wherein the first driving torque transmitting members are provided on an axis parallel to the finger joint coaxially.

8. The robot hand according to claim 1, wherein at least one gear of the first driving torque transmitting member meshes with at least one gear of the second driving torque transmitting member.

9. The robot hand according to claim 1, wherein the second driving torque transmitting members correspond to the first driving torque transmitting members on a one-to-one basis.

10. The robot hand according to claim 1, wherein the second driving torque transmitting members correspond to a plurality of the first driving torque transmitting members on a N-to-one basis (N is not less than 2).

11. The robot hand according to claim 1, wherein the movable section of the hand section is at least 15 movable sections corresponding to joints of first proximal phalange sections, second proximal phalange sections, and intermediate phalange sections of first to fifth fingers, and a movable section of a wrist joint, and at least 15 of the first driving torque transmitting members corresponding to at least the 15 movable sections and a wrist driving torque transmitting member corresponding to the movable section of the wrist joint are provided coaxially.

12. The robot hand according to claim 1, wherein the hand section includes a rotating member that is disposed in an adjacent movable section that is adjacent to a certain movable section and rotates in the movable direction of the adjacent movable section, and a link member that links the first pulley corresponding to the certain movable section and the rotating member corresponding to the adjacent movable section.

13. The robot hand according to claim 1, wherein the first driving torque transmitting member includes a first plurality of independent pairs of gears, and the second driving torque transmitting member includes a second plurality of independent pairs of gears.

14. A robot hand comprising a hand section that includes a movable section of a finger joint and an arm section that generates driving torque for driving the movable section, wherein the hand section includes a first pulley that is disposed in the movable section and turns in a movable direction, a second pulley disposed on the wrist side with respect to the movable section, a first driving torque transmitting member that transmits driving torque for rotating the second pulley, a linear member that is fixed to the first pulley and fixed to the second pulley to connect the first pulley and the second pulley, the first driving torque transmitting member is configured integrally with the second pulley and has a rotational axis coaxial with the rotational axis of the second pulley, the arm section includes a second driving torque transmitting member that transmits the driving torque to the first driving torque transmitting member, a drive unit that generates the driving torque, and a control unit that controls the drive unit, the control unit calculates a rotation angle correction value of the first pulley in advance, stores information of a correction value of a joint angle instruction value of a finger joint to be sent to the drive unit, and performs joint angle control for the second driving torque transmitting member to compensate operation interference of the second pulley caused by rotation of the first driving torque transmitting member, and moves the movable section.

15. The robot hand according to claim 14, wherein the movable section is a movable section of any of a first proximal phalange section, a second proximal phalange section, and an intermediate phalange section of finger joints.

16. The robot hand according to claim 14, wherein corresponding to a plurality of movable sections, a plurality of the first pulleys, a plurality of the second pulleys to be connected to the first pulleys via the linear members, and a plurality of the first driving torque transmitting members that are integrated with the second pulleys and rotate coaxially, are provided coaxially, respectively.

17. The robot hand according to claim 14, wherein the first driving torque transmitting members are provided on an axis parallel to the finger joint coaxially.

18. The robot hand according to claim 14, wherein the hand section and the arm section are joined to and separated from each other via the first driving torque transmitting member and the second driving torque transmitting member.

19. The robot hand according to claim 14, wherein the second driving torque transmitting members correspond to the first driving torque transmitting members on a one-to-one basis.

20. The robot hand according to claim 14, wherein the second driving torque transmitting members correspond to a plurality of the first driving torque transmitting members on a N-to-one basis (N is not less than 2).

21. The robot hand according to claim 14, wherein the movable section of the hand section is at least 15 movable sections corresponding to joints of first proximal phalange sections, second proximal phalange sections, and intermediate phalange sections of first to fifth fingers, and a movable section of a wrist joint, and at least 15 of the first driving torque transmitting members corresponding to at least the 15 movable sections and a wrist driving torque transmitting member corresponding to the movable section of the wrist joint are provided coaxially.

22. The robot hand according to claim 14, wherein the hand section includes a rotating member that is disposed in an adjacent movable section that is adjacent to a certain movable section and rotates in the movable direction of the adjacent movable section, and a link member that links the first pulley corresponding to the certain movable section and the rotating member corresponding to the adjacent movable section.

* * * * *